T. P. MOHR.
TIRE FOR AUTOMOBILES.
APPLICATION FILED OCT. 11, 1915.
1,172,030. Patented Feb. 15, 1916.
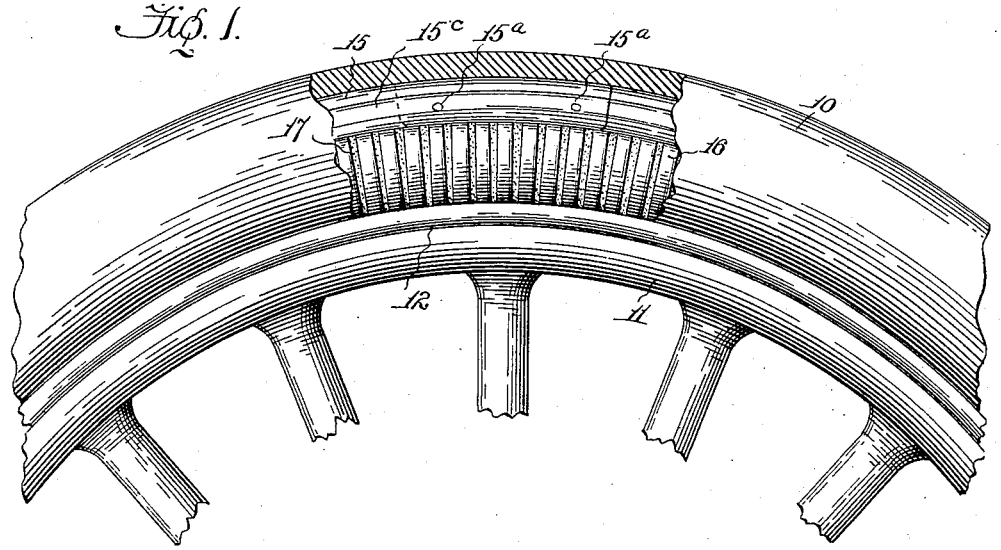
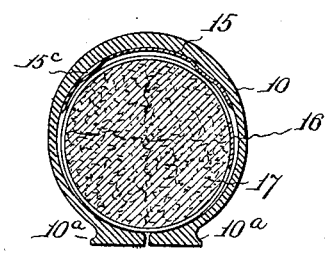
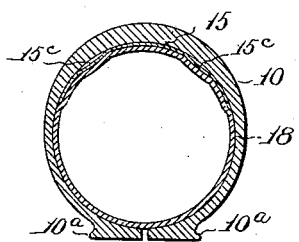
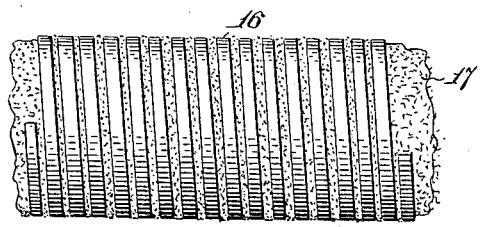
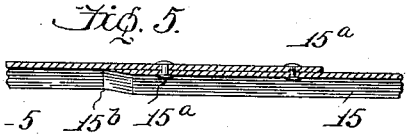
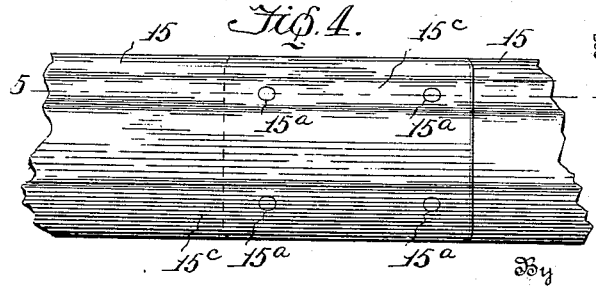
Inventor
Theodore P. Mohr.
By
Attorneys

UNITED STATES PATENT OFFICE.

THEODORE P. MOHR, OF NEW ORLEANS, LOUISIANA.

TIRE FOR AUTOMOBILES.

1,172,030.   Specification of Letters Patent.   Patented Feb. 15, 1916.

Application filed October 11, 1915. Serial No. 55,269.

*To all whom it may concern:*

Be it known that I, THEODORE P. MOHR, a citizen of the United States, residing at New Orleans, in the parish of Orleans and State of Louisiana, have invented a Tire for Automobiles, of which the following is a full and complete specification.

My invention is an improvement in tires of that particular class which provide a resilient tread yieldable to the extent of relieving the vehicle of jolts and jars in passing over uneven surfaces, and promoting traction by affording an effective grip on the roadway. The conventional type of tire of this general character is constructed of an outer casing or shoe composed principally of rubber and attached to the rim of the wheel in a suitable manner, in connection with a continuous rubber tube inclosed within the shoe or casing and inflated sufficiently to insure the tire-structure properly sustaining the load of the vehicle and giving the required resiliency, commonly known as a pneumatic tire. However, a tire of this nature though generally practical is dependent for constant successful operation on the perfect or unimpaired condition of the inner tube, and as the latter is liable to be punctured when the shoe or casing is pierced by any object the life or utility of such a tire-structure is uncertain.

It is the purpose of my invention, therefore, to provide a vehicle-tire possessing all the advantages of the ordinary pneumatic tire with the additional and important advantage of not being liable to deflation or collapse by puncture, and this purpose I attain in the present instance by certain mechanical means herein shown described, and specifically claimed.

In the accompanying drawings, which form a part hereof—Figure 1 is a fragmentary view of a wheel provided with a tire constructed in accordance with my present invention, a part of the casing or shoe being broken away to show the internal construction. Fig. 2 is a transverse sectional view through the tire. Fig. 3 is a side view of the means employed for maintaining the flexible casing or shoe yieldably distended. Fig. 4 is a plan view of a portion of a metal ring or shield forming part of the tire structure. Fig. 5 is a longitudinal sectional view through the metal ring or shield, on the line 5—5 of Fig. 4. Fig. 6 is a modification of my invention, illustrating the metal ring or shield employed in connection with an ordinary rubber inner tube.

Like numerals of reference indicate like parts in all the figures of the drawings.

Referring to the drawings, 10 designates an outer casing or shoe of flexible material, such as rubber, and provided at its inner edges with suitable means, as the ribs $10^a$, for attaching the same to the rim 11 of the wheel by contracting rings 12; these parts being of the usual and ordinary construction, and therefore other means for attaching the casing or shoe to the rim may be employed.

In carrying out my invention the outer casing or shoe is provided with a flat metal ring 15, fitting within said casing at the outer or tread portion thereof, and therefore curved transversely to approximate the contour of this part of the inner wall of said casing. This metal ring forms a shield, and in order that it may readily yield with the tread portion of the casing or shoe as the wheel passes over the ground said ring is made of a strip of thin steel with the ends lapped one over the other and rigidly connected together in any suitable manner, preferably by rivets $15^a$, as shown in Figs. 4 and 5, and in order to prevent the end $15^b$ of the inner portion of the lapped joint interfering with the other parts, hereinafter referred to, said end is beveled, as shown in Fig. 5, and in practice may be welded to the other portion of said joint. Furthermore, the metal strip is curved at either side of its center, as at $15^c$, $15^c$, for the purpose hereinafter explained.

In connection with the metal strip or shield just described I employ a medium for yieldably distending the tire comprising a ring 16, round in cross-section and of approximately the same diameter as the internal diameter of the casing or shoe 10, within which it is adapted to snugly fit. In this instance said ring is in the form of a continuous helical spring, and is made of flat steel wire with the helices or convolutions spaced a slight distance apart, the gage of the flat wire depending upon the size of the tire and load it is intended the wheel shall support. In using this yieldable casing supporting ring the protecting metal shield 15 is interposed between it and the tread portion of the casing or shoe, as illustrated in Fig. 1 of the drawings, to assist in reinforcing the same or increasing its stability, as well as to reduce the wear between the ring and the shoe or casing.

It will be apparent that the inwardly curved portions 15°, 15°, which extend circumferentially at a short distance from each side of the center of the spring metal strip or shield 15 serve a two-fold purpose; first, to form a bridge portion therebetween and reinforcing portions therebeyond, whereby said bridge portion will yield readily under ordinary conditions in the running of the wheel and the reinforcing portions take up the strain of an extraordinary load or when the tire strikes an obstruction; and, second, the inwardly curved portions form reduced bearing surfaces resting against the helical spring to co-act therewith in providing a greater amount of resiliency.

In order to prevent the convolutions of the spring-like shoe-supporting-ring from lapping one over the other I provide a filling medium consisting of a hemp rope 17 consisting of several strands twisted together, as indicated in Fig. 2, and entirely filling said ring, whereby it will not only effectually prevent the convolutions lapping as the tire structure yields in the operation of the wheel but will also tend to assist the parts in carrying the load supported by the wheel.

As shown and hereinbefore described a tire constructed in accordance with my invention consists of the flexible outer casing or shoe 10, the supporting and distending ring 16 with its filling medium 17, and the interposed thin sheet metal or steel shield 15; these parts coöperating to form a structure that will yield to a certain extent as the wheel passes over the ground and thus being resilient will readily take up any jars or jolts incident to the vehicle passing over uneven surfaces. It will be noted, also, that the parts relied upon to properly distend the casing or shoe are possessed of sufficient strength to withstand the work to which such a wheel is ordinarily subjected.

In some instances, I contemplate using the metal shield 15 in connection with a rubber tube, or what is commonly known as an inner tube, 18, shown in the modification Fig. 6 of the drawings; and in this instance the protecting shield not only acts to reinforce or stabilitate the casing, in connection with the said inner tube, but also serves the important purpose of protecting the inner tube at that portion thereof liable to be punctured; viz.: that portion located at the tread of the tire structure. The stability of the tire is increased by the fact that the protecting shield is firm, inasmuch as the ends are riveted together and therefore uniformly yieldable at every point.

In either instance the tire structure is non-puncturable, or rather will not become deflated or collapse should a sharp object pierce the casing or shoe; and therefore the life of the tire will depend entirely on the wearing quality of the casing or shoe, and when this wears out it is only necessary to replace it, the other parts being practically indestructible.

Having thus described my invention, what I claim as new and desire to secure by Letters Patent is:

1. A tire for automobiles comprising an outer shoe or casing of flexible material, a shield formed of a flat strip of spring metal curved transversely to fit within the tread portion of the shoe or casing and having inwardly curved portions extending circumferentially at a short distance from each side of the center of the strip forming a bridge portion therebetween and reinforcing portions therebeyond, said spring metal strip being rigidly connected together at its ends, and means located within the casing and shield for yieldably distending the parts, substantially as shown and described.

2. A tire for automobiles comprising an outer shoe or casing of flexible material, a shield formed of a flat strip of spring metal riveted together at its ends and fitting within the tread portion of the shoe or casing and having inwardly curved portions extending circumferentially at a short distance from each side of the center of the strip forming a bridge portion therebetween and reinforcing portions therebeyond, a supporting yieldable ring within the shoe or casing to bear against the inner side of the metal shield and formed of a helical spring of flat wire connected together at its ends, and yieldable material packed within the ring to fill the same, substantially as shown and for the purpose set forth.

THEODORE P. MOHR.

Witnesses:
ROSALEE TURA,
CORIMO PORILLO.

Copies of this patent may be obtained for five cents each, by addressing the "Commissioner of Patents, Washington, D. C."